US012562294B2

(12) United States Patent
Tanaka et al.

(10) Patent No.: US 12,562,294 B2

(45) Date of Patent: Feb. 24, 2026

(54) INSULATED ELECTRIC WIRE

(71) Applicant: Sumitomo Electric Industries, Ltd., Osaka (JP)

(72) Inventors: Shigeyuki Tanaka, Osaka (JP); Taro Fujita, Osaka (JP); Atsuko Shinomiya, Osaka (JP); Jo Yagisawa, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 111 days.

(21) Appl. No.: 18/019,430

(22) PCT Filed: Jul. 21, 2021

(86) PCT No.: PCT/JP2021/027306

§ 371 (c)(1), (2) Date: Feb. 2, 2023

(87) PCT Pub. No.: WO2022/030264

PCT Pub. Date: Feb. 10, 2022

(65) Prior Publication Data

US 2023/0290535 A1 Sep. 14, 2023

(30) Foreign Application Priority Data

Aug. 4, 2020 (JP) ................................. 2020-132629

(51) Int. Cl.

*H01B 3/44* (2006.01)
*H01B 7/00* (2006.01)

(Continued)

(52) U.S. Cl.

CPC ........... *H01B 3/441* (2013.01); *H01B 7/0009* (2013.01); *H01B 7/282* (2013.01); *H01B 7/292* (2013.01)

(58) Field of Classification Search

CPC . H01B 1/02; H01B 1/026; H01B 3/28; H01B 3/30; H01B 3/22; H01B 7/18;

(Continued)

(56) References Cited

U.S. PATENT DOCUMENTS 5,236,985 A * 8/1993 Hayami ................... C08K 3/22 524/436
5,505,900 A * 4/1996 Suwanda ................ B29C 71/04 264/495

(Continued)

FOREIGN PATENT DOCUMENTS

JP H05-78586 A 3/1993
JP H10-212377 A 8/1998

(Continued)

*Primary Examiner* — William H. Mayo, III

(74) *Attorney, Agent, or Firm* — Volpe Koenig

(57) ABSTRACT

An insulated electric wire includes a conductor formed of a plurality of element wires twisted together, and an insulating layer covering an outer periphery of the conductor. The insulating layer is formed of a crosslinked product of a polymer composition. The polymer composition contains, as a main component, an ethylene-based copolymer, polyethylene, or a combination of an ethylene-based copolymer and polyethylene. The crosslinked product has a gel fraction of 60% or more, and the crosslinked product has a tensile elongation of 150% or more.

20 Claims, 1 Drawing Sheet

(51) Int. Cl.
*H01B 7/282* (2006.01)
*H01B 7/29* (2006.01)

(58) Field of Classification Search
CPC ...... H01B 7/1825; H01B 7/295; H01B 3/308; H01B 3/44; H01B 3/445; H01B 7/34; H01B 13/0016; C08L 23/04; C08L 23/08; C08K 3/22; C08K 5/24; C08K 9/00
USPC ....... 174/110 R–120 SC; 524/265, 430, 433, 524/436, 543
See application file for complete search history.

(56) References Cited

U.S. PATENT DOCUMENTS

| | | | | |
|---|---|---|---|---|
| 5,747,574 | A * | 5/1998 | Kanamori | H01B 3/44 524/436 |
| 6,534,119 | B1 | 3/2003 | Tsuji et al. | |
| 2005/0171263 | A1* | 8/2005 | Kanamori | C08K 3/016 524/543 |
| 2006/0167158 | A1* | 7/2006 | Yagi | C08L 23/06 524/514 |
| 2009/0133926 | A1 | 5/2009 | Kambe | |
| 2009/0255707 | A1* | 10/2009 | Moriuchi | C08L 75/06 174/110 SR |
| 2012/0273268 | A1 | 11/2012 | Shimada et al. | |
| 2014/0011028 | A1* | 1/2014 | Iwasaki | H01B 7/295 428/389 |
| 2014/0141245 | A1* | 5/2014 | Iwasaki | H01B 3/46 524/436 |
| 2017/0040086 | A1* | 2/2017 | Nakahashi | C09D 123/0892 |
| 2018/0061526 | A1* | 3/2018 | Furukawa | H01B 13/0016 |
| 2020/0079969 | A1* | 3/2020 | Takahashi | C08K 13/02 |

FOREIGN PATENT DOCUMENTS

| | | | | |
|---|---|---|---|---|
| JP | 2000-327935 | A | 11/2000 | |
| JP | 2001-6448 | A | 1/2001 | |
| JP | 2004-256621 | A * | 9/2004 | C08L 23/08 |
| JP | 2004-339317 | A | 12/2004 | |
| JP | 2007-339317 | A * | 12/2004 | C08L 23/00 |
| JP | 2009-051918 | A | 3/2009 | |
| JP | 2009-127040 | A | 6/2009 | |
| JP | 2011-126961 | A | 6/2011 | |
| JP | 2017-128814 | A | 7/2017 | |
| JP | 2018029008 | A * | 2/2018 | H01B 13/14 |
| WO | 2011-102324 | A1 | 8/2011 | |
| WO | 2016-084613 | A1 | 6/2016 | |

* cited by examiner

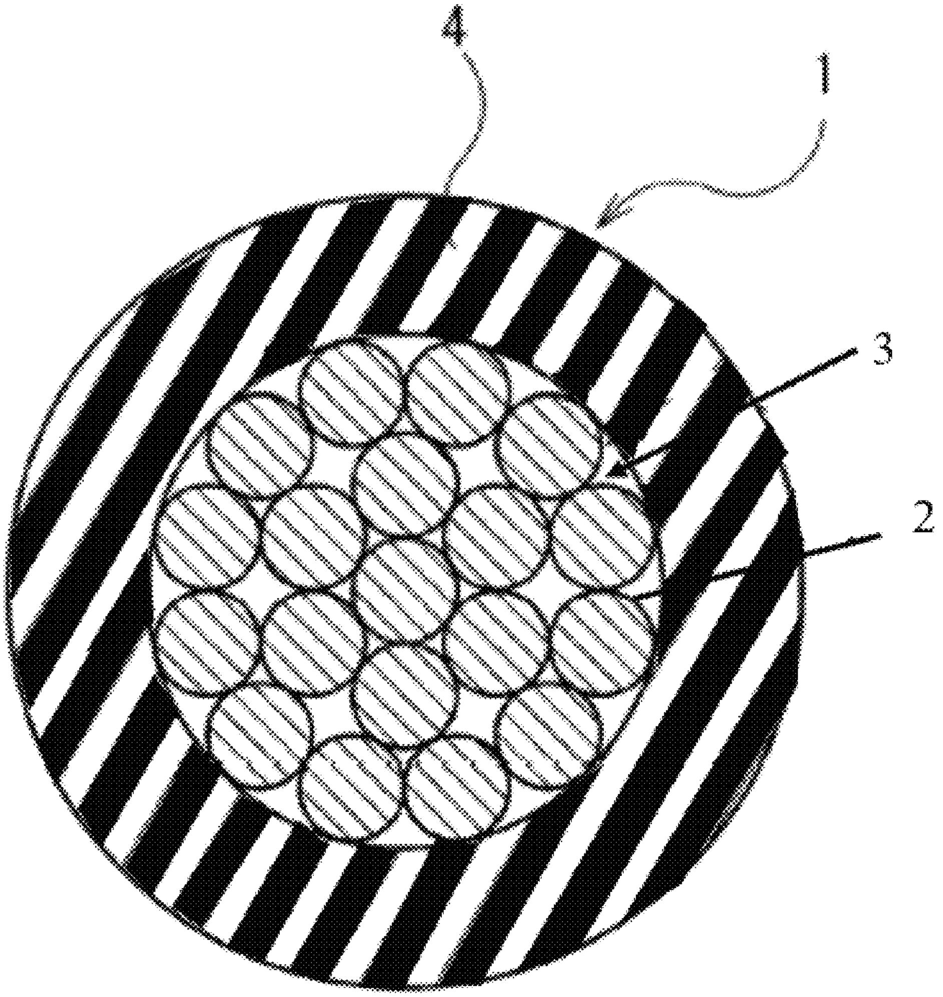
4
1
3
2

INSULATED ELECTRIC WIRE

TECHNICAL FIELD

The present disclosure relates to an insulated electric wire. This application claims priority based on Japanese Patent Application No. 2020-132629 filed on Aug. 4, 2020, and the entire contents of the Japanese patent application are incorporated herein by reference.

BACKGROUND ART

An insulated electric wire for wiring in a vehicle such as an automobile and an insulating material which is a material of an insulating layer thereof are required to have long-term heat resistance such that they do not deteriorate for a long period of time even in a high-temperature environment due to heat generation or the like during energization. Further, when a terminal of an insulated electric wire is processed and used as a connector, in order to prevent water from entering a connection portion from the outside, a method is adopted in which an insulating material is compressed and deformed by using a rubber ring or the like and water is stopped by the repulsion thereof. In order to secure the water-stop performance, the insulating material is required to have creep deformation resistance.

In the prior art, there have been proposed a halogen-free resin composition containing a base resin composed of a polypropylene-based resin, a propylene-α-olefin copolymer, and a low-density polyethylene resin; a metal hydrate; a phenol-based antioxidant; and a hydrazine-based metal scavenger. In the prior art, there have been proposed also an insulated electric wire having the resin composition as an insulating layer, and a wire harness including the insulated electric wire (see PTL 1).

PRIOR ART DOCUMENT

Patent Literature

PTL 1: Japanese Unexamined Patent Application Publication No. 2009-127040

SUMMARY OF INVENTION

An insulated electric wire according to an aspect of the present disclosure includes a conductor formed of a plurality of element wires twisted together, and an insulating layer covering an outer periphery of the conductor. The insulating layer is formed of a crosslinked product of a polymer composition. The polymer composition contains, as a main component, an ethylene-based copolymer, polyethylene, or a combination of an ethylene-based copolymer and polyethylene. The crosslinked product has a gel fraction of 60% or more, and the crosslinked product has a tensile elongation of 150% or more.

BRIEF DESCRIPTION OF DRAWINGS

FIG. 1 is a schematic cross-sectional view of an insulated electric wire according to an embodiment of the present disclosure.

DESCRIPTION OF EMBODIMENTS

Problems to be Solved by Present Disclosure

An insulating layer formed of a resin composition used in an insulated electric wire of the prior art does not have sufficient long-term heat resistance and water-stopping performance (terminal water-stopping performance), and it is required to improve long-term heat resistance and secure sufficient water-stopping performance (terminal water-stopping performance) for coping with large heat generation due to energization of a large current.

The present disclosure has been made in view of the above-described circumstances, and an object thereof is to provide an insulated electric wire having excellent long-term heat resistance and water-stopping performance.

Advantageous Effects of Present Disclosure

An insulated electric wire according to an aspect of the present disclosure is excellent in long-term heat resistance and water-stopping performance.

DESCRIPTION OF EMBODIMENTS OF PRESENT DISCLOSURE

First, embodiments of the present disclosure will be listed and described.

An insulated electric wire according to an aspect of the present disclosure includes a conductor formed of a plurality of element wires twisted together, and an insulating layer covering an outer periphery of the conductor. The insulating layer is formed of a crosslinked product of a polymer composition. The polymer composition contains, as a main component, an ethylene-based copolymer, polyethylene, or a combination of an ethylene-based copolymer and polyethylene. The crosslinked product has a gel fraction of 60% or more, and the crosslinked product has a tensile elongation of 150% or more.

In the insulated electric wire, it is considered that long-term heat resistance and creep properties are enhanced, when the insulating layer is a crosslinked product of a polymer composition including an ethylene-based copolymer, polyethylene, or a combination thereof as a main component, and the gel fraction of the crosslinked product is 60% or more. In addition, when the tensile elongation is 150% or more, the flexibility is improved, and cracking or breaking under a use environment can be suppressed, and thus it is possible to further improve the water-stop performance (terminal water-stopping performance). Therefore, the insulated electric wire has excellent long-term heat resistance and water-stopping performance. The term "crosslinked product" refers to a material obtained by crosslinking a polymer composition. The term "main component" refers to a substance having the highest content among constituent substances, for example, a substance having a content of 50% by mass or more. The term "creep modulus" refers to the ratio of strain to initial stress. The term "gel fraction" refers to an indicator of the degree of crosslinking of the base polymer, and is measured according to the crosslinking degree measurement of JASO (Japanese Automotive Standards Organization) D625. The term "tensile elongation" refers to the tensile elongation (%) measured according to the insulation tensile test of JASO D625.

The crosslinked product may have a creep modulus of 0.3 MPa or more, as calculated under a condition of maintaining the crosslinked product at 150° C. for 1,500 hours. Since crosslinked product has a creep modulus of 0.3 MPa or more, as calculated under a condition of maintaining the crosslinked product at 150° C. for 1,500 hours, the crosslinked product can have creep deformation resistance capable of securing sufficient water-stopping performance (terminal water-stopping performance).

The crosslinked product may have a tensile elongation of 50% or more after being maintained at 150° C. for 1,500 hours. Since the crosslinked product has a tensile elongation of 50% or more after being maintained at 150° C. for 1,500 hours, the long-term heat resistance of the insulated electric wire can be further enhanced.

The insulated electric wire may be used as a high-voltage electric wire for an automobile. By using the insulated electric wire as a high-voltage electric wire for an automobile, it is possible to provide a high-voltage electric wire for an automobile having excellent long-term heat resistance and water-stopping performance. As used herein, the term "high-voltage electric wire for an automobile" refers to a high-voltage electric wire as an automobile component specified in JASO D624.

Details of Embodiments of Present Disclosure

Hereinafter, an insulated electric wire according to embodiments of the present disclosure will be described in detail with reference to the drawings.

<Insulated Electric Wire>

An insulated electric wire according to an embodiment of the present disclosure includes a conductor formed of a plurality of element wires twisted together, and an insulating layer covering an outer periphery of the conductor. An insulated electric wire 1 shown in FIG. 1 includes a linear conductor 3 formed of a plurality of element wires 2 twisted together, and an insulating layer 4 which is a protective layer covering an outer periphery of conductor 3.

The cross-sectional shape of insulated electric wire 1 is not particularly limited, but is, for example, circular. When the cross-sectional shape of insulated electric wire 1 is circular, the average outer diameter thereof varies depending on the use, but can be, for example, 1 mm to 20 mm. Here, the term "average outer diameter" refers to an average value of diameters measured at arbitrary ten points. A method for measuring the average outer diameter is not particularly limited. For example, an average value obtained when diameters are measured using a caliper can be set as the average outer diameter.

(Conductor)

Conductor 3 is formed by twisting a plurality of element wires 2 at a constant pitch. Element wire 2 is not particularly limited, and examples thereof include a copper wire, a copper alloy wire, an aluminum wire, and an aluminum alloy wire. In addition, conductor 3 may be a twisted stranded wire formed of a plurality of stranded element wires further twisted together by using a stranded element wire formed of a plurality of element wires 2 twisted together. The flexibility of the cable can be improved by using the twisted stranded wire. The stranded wire to be twisted may be formed by twisting the same number of element wires 2.

The number of element wire 2 is appropriately designed in accordance with the use of the multi-core cable, the diameter of element wire 2, and the like, but the lower limit thereof is 7, and may be 19. On the other hand, the upper limit of the number of element wire 2 is 2450, and may be 2000. Examples of the twisted stranded wire include a twisted stranded wire having 247 element wires 2 each of which is obtained by further twisting 19 stranded element wires each of which is obtained by twisting 13 element wires 2, a twisted stranded wire having 798 element wires 2 each of which is obtained by further twisting 19 stranded element wires each of which is obtained by twisting 42 element wires 2, and a twisted stranded wire having 1998 element wires 2 each of which is obtained by further twisting 37 stranded element wires each of which is obtained by twisting 54 element wires 2.

The lower limit of the average outer diameter of element wire 2 is 100 μm. On the other hand, the upper limit of the average outer diameter of element wire 2 is 600 μm. When the average outer diameter of element wire 2 is smaller than 100 μm or exceeds 600 μm, the effect of improving the bending resistance of insulated electric wire 1 may not be sufficiently exhibited. The lower limit of the average outer diameter of the element wire2 may be 150 μm or 180 μm. On the other hand, the upper limit of the average outer diameter of the element wire2 may be 600 μm or 500 μm. A method for measuring the average outer diameter of the element wire2 is not particularly limited. For example, an average value obtained by measuring outer diameters at arbitrary three points of the element wire2 using a micrometer having cylindrical both ends may be used as the average outer diameter.

The lower limit of the range of the average cross-sectional area of conductor 3 is 0.5 $mm^2$. On the other hand, the upper limit of the range of the average cross-sectional area of conductor 3 is 100 $mm^2$. By setting the average cross-sectional area of conductor 3 within the above range, insulated electric wire 1 can be suitably used as an in-vehicle high-voltage electric wire. The lower limit of the range of the average cross-sectional area of conductor 3 may be 1.0 $mm^2$, 2.0 $mm^2$, or 3.0 $mm^2$. The upper limit of the range of the average cross-sectional area of conductor 3 may be 95 $mm^2$. The average cross-sectional area of conductor 3, the cross-sectional area per element wire 2 is calculated from the average outer diameter of element wire 2, and the product of the cross-sectional area per element wire 2 and the number of elements wire 2 is set as the average cross-sectional area of conductor 3.

[Insulating Layer]

Insulating layer 4 is a crosslinked product of a polymer composition. Examples of the method for crosslinking the polymer composition constituting insulating layer 4 include an irradiating ionizing radiation method and a method using a thermal crosslinking agent. Insulating layer 4 is formed of a polymer composition and is laminated on the outer periphery of conductor 3 to cover conductor 3. The average thickness of insulating layer 4 is not particularly limited, but is, for example, 0.1 mm to 5 mm. Here, the "average thickness" refers to, for example, an average value of thicknesses measured at arbitrary ten points using a caliper. In the following description, the "average thickness" of other members is defined in the same manner.

The main component of the polymer composition may be ethylene-based copolymer, polyethylene, or a combination thereof. When the main component of the polymer composition is ethylene-based copolymer, polyethylene, or a combination thereof, the long-term heat resistance of insulating layer 4 can be improved.

(Ethylene-Based Copolymer)

Examples of the ethylene-based copolymer include a copolymer of ethylene and α-olefin having a carbonyl group, and an ethylene-based rubber.

<Copolymer of Ethylene and α-Olefin Having Carbonyl Group>

Examples of the α-olefin having a carbonyl group in the copolymer of ethylene and α-olefin having a carbonyl group include (meth) acrylic acid alkyl esters such as methyl (meth) acrylate and ethyl (meth) acrylate; (meth) acrylic acid aryl esters such as phenyl (meth) acrylate; vinyl esters such as vinyl acetate and vinyl propionate; unsaturated acids such as (meth) acrylic acid, crotonic acid, maleic acid, and itaconic acid; vinyl ketones such as methyl vinyl ketone and phenyl vinyl ketone; and (meth) acrylic acid am ides.

Examples of the copolymer main component resin of ethylene and α-olefin having a carbonyl group include resins such as an ethylene-methyl acrylate copolymer (EMA), an ethylene-butyl acrylate copolymer (EBA), an ethylene-vinyl acetate copolymer (EVA), and an ethylene-ethyl acrylate copolymer (EEA).

The lower limit of the content of the α-olefin having a carbonyl group is 5% by mass. When the content of the α-olefin having a carbonyl group is less than 5% by mass, the effect of improving long-term heat resistance and water-stopping performance may be insufficient. On the other hand, the upper limit of the content of the α-olefin having a carbonyl group is 45% by mass. When the content of the α-olefin having a carbonyl group exceeds 45% by mass, the mechanical properties such as strength of insulating layer 4 may be deteriorated. The lower limit of the content of the α-olefin having a carbonyl group may be 10% by mass. This is because sufficient heat resistance and water-stop performance can be obtained. On the other hand, the upper limit of the content of the α-olefin having a carbonyl group may be 40% by mass. This is because sufficient mechanical strength can be obtained.

<Ethylene-Based Rubber>

Examples of the ethylene-based rubber include ethylene-α-olefin copolymers, ethylene-α-olefin-non-conjugated polyene copolymers, and ethylene-acrylic acid ester copolymers.

Examples of the α-olefin in the ethylene-α-olefin copolymer and the ethylene-α-olefin-nonconjugated polyene copolymer include α-olefins having 3 to 20 carbon atoms. Examples of the α-olefin having 3 to 20 carbon atoms include propylene, 1-butene, 4-methyl-1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-nonadecene, 1-eicosene-1, 9-methyl-1-decene, 11-methyl-1-dodecene, and 12-ethyl-1-tetradecene. These α-olefins may be used alone or in combination of two or more thereof.

The non-conjugated polyene in the ethylene-α-olefin-non-conjugated polyene copolymer has, for example, 5 to 20 carbon atoms, preferably 5 to 10 carbon atoms, and examples thereof include 1, 4-pentadiene, 1, 4-hexadiene, 1, 5-hexadiene, 1, 4-octadiene, 1, 5-octadiene, 1, 6-octadiene, 1, 7-octadiene, 2-methyl-1, 5-hexadiene, 6-methyl-1, 5-heptadiene, 7-methyl-1, 6-octadiene, 4-ethylidene-8-methyl-1, 7-nonadiene, 4, 8-dimethyl-1, 4, 8-decatriene, dicyclopentadiene, cyclohexadiene, dicyclooctadiene, methylenenorbornene, 5-vinylnorbornene, 5-ethylidene-2-norbornene, 5-methylene-2-norbornene, 5-vinylidene-2-norbornene, 5-isopropylidene-2-norbornene, 6-chloromethyl-5-isopropenyl-2-norbornene, 2, 3-diisopropylidene-5-norbornene, 2-ethylidene-3-isopropylidene-5-norbornene, and 2-propenyl-2, 2-norbornadiene.

Examples of the acrylic acid ester in the ethylene-acrylic acid ester copolymer include ethyl acrylate.

Examples of the ethylene-based rubber include ethylene-propylene rubber (EPM), ethylene-propylene-diene rubber (EPDM), and ethylene-acrylic rubber.

(Polyethylene)

Examples of polyethylene include linear low-density polyethylene (LLDPE), very low-density polyethylene (VLDPE), high-density polyethylene (HDPE), and low-density polyethylene (LDPE).

The main component of the polymer composition may be a polymer such as an ethylene-methyl acrylate copolymer which is a copolymer of ethylene and α-olefin having a carbonyl group, polyethylene such as very low-density polyethylene and linear low density polyethylene, and ethylene-based rubber such as EP rubber, from the viewpoint of improving long-term heat resistance and water-stopping performance.

Insulating layer 4 may contain a resin other than the main component resin. The upper limit of the content of the other resin is 50% by mass, and may be 30% by mass. In addition, insulating layer 4 may not substantially contain other resins.

Insulating layer 4 may contain additives such as a flame retardant, an antioxidant, a crosslinking aid, and a thermal crosslinking agent.

(Flame Retardant)

By containing the flame retardant, the flame retardancy of insulated electric wire 1 can be improved. Examples of the flame retardant include bromine-based flame retardants, antimony trioxide, antimony pentoxide, zinc borate, and metal hydroxides, and these can be used alone or in combination of two or more kinds thereof. However, it is necessary to increase the filling amount of the metal hydroxide in order to obtain sufficient flame retardancy. Since the properties are often impaired such as a decrease in mechanical strength and a decrease in long-term heat resistance, a bromine-based flame retardant and antimony trioxide may be used in combination as the flame retardant.

Examples of the bromine-based flame retardant include ethylenebis (pentabromophenyl) and decabromodiphenylethane. Examples of the metal hydroxide include magnesium hydroxide and aluminum hydroxide.

The content of the flame retardant in the polymer composition may be 10 parts by mass to 200 parts by mass with respect to 100 parts by mass of the polymer. When the content of the flame retardant is less than 10 parts by mass, sufficient flame retardancy may not be obtained. On the other hand, when the content of the flame retardant exceeds 200 parts by mass, the mechanical strength of insulating layer 4 may be lowered.

(Antioxidant)

The stability can be improved by adding an antioxidant. Examples of the antioxidant include a sulfur-based antioxidant and a phenol-based antioxidant.

The content of the antioxidant in the polymer composition may be 1 part by mass to 10 parts by mass with respect to 100 parts by mass of the polymer. When the content of the antioxidant is less than 1 part by mass, there is a possibility that a sufficient effect of suppressing oxidative deterioration cannot be obtained. On the other hand, when the content of the antioxidant exceeds 10 parts by mass, the mechanical strength of insulating layer 4 may be lowered.

(Crosslinking Aid)

The crosslinking aid is added to promote crosslinking of the polymer by irradiation with ionizing radiation. In addition, the mechanical strength such as tensile strength of insulating layer 4 can be improved by irradiating the polymer composition containing the crosslinking aid with ionizing radiation to crosslink the polymer.

Examples of the crosslinking aid include isocyanurates such as triallyl isocyanurate (TAIC) and diallyl monoglycidyl isocyanurate (DA-MGIC), and trimethylolpropane trimethacrylate. These may be used alone or in combination of two or more kinds thereof. Among them, trimethylolpropane trimethacrylate may be used for effective crosslinking.

The content of the crosslinking aid in the polymer composition may be 1 part by mass to 10 parts by mass with respect to 100 parts by mass of the polymer. When the content of the crosslinking aid is less than 1 part by mass, crosslinking does not sufficiently proceed, and the mechanical strength of insulating layer 4 may be lowered. On the other hand, when the content of the crosslinking aid exceeds10 parts by mass, the crosslinking density becomes too high, so that insulating layer 4 becomes hard and the flexibility may be impaired.

(Thermal Crosslinking Agent)

The thermal crosslinking agent is used in a method for mixing a crosslinking agent into a polymer and heating the mixture to cause a reaction, thereby performing thermal crosslinking. As the thermal crosslinking agent, an organic peroxide is mainly used. Examples of the organic peroxide include dicumyl peroxide (DCP) and 2,5-dimethyl-2,5-di (tert-butylperoxy)hexane. As a thermal crosslinking agent, an addition-type crosslinking agent containing a platinum-based catalyst or a curing agent may be used.

The content of the thermal crosslinking agent in the polymer composition may be 1 part by mass to 5 parts by mass with respect to 100 parts by mass of the polymer. When the content of the thermal crosslinking agent is less than 1 part by mass, crosslinking does not sufficiently proceed, and the mechanical strength of insulating layer 4 may decrease. On the other hand, when the content of the thermal crosslinking agent exceeds 5 parts by mass, there is a possibility that the crosslinking density becomes too large, insulating layer 4 becomes hard, and flexibility is impaired.

Insulating layer 4 may contain additives such as a flame retardant aid, a lubricant, a colorant, a reflection-imparting agent, a masking agent, a processing stabilizer, and a plasticizer in addition to the flame retardant, the antioxidant, the crosslinking aid, and the thermal crosslinking agent.

[Physical Properties of Crosslinked Product]

(Creep Modulus Calculated Under the Condition of Maintaining the Crosslinked Product at 150° C. for 1,500 hours)

The lower limit of the creep modulus calculated under the condition of maintaining the crosslinked product at 150° C. for 1,500 hours is 0.3 MPa. Since the crosslinked product has a creep modulus of 0.3 MPa or more, as calculated under a condition of maintaining the crosslinked product at 150° C. for 1,500 hours, the crosslinked product can have creep deformation resistance capable of securing sufficient water-stopping performance (terminal water-stopping performance). The lower limit of the creep modulus calculated under the condition of maintaining the crosslinked product at 150° C. for 1,500 hours may be 0.32 MPa. Further, the water-stopping performance can be improved.

The creep modulus calculated under the condition of maintaining the crosslinked product at 150° C. for 1,500 hours can be obtained as follows. The measurement is performed using a viscoelasticity measuring apparatus while varying the temperature and the frequency, and a double logarithmic graph of the frequency and the storage elastic modulus is prepared by moving in parallel based on 150° C. in accordance with the temperature-time conversion measurement. A power approximate expression for the data is obtained, and the storage modulus at $1.9\times10^{-7}$ Hz corresponding to 1,500 hours is determined using the approximate expression. The "storage modulus" refers to a value measured according to the test method of dynamic mechanical properties described in JIS K7244-4 (1999), and is a value measured at the above-described temperatures and frequencies under conditions of a tensile mode and a strain of 0.08% using a viscoelasticity measuring apparatus. As the viscoelasticity measuring apparatus, for example, "DVA-220" manufactured by IT Measurement Control Co., Ltd. can be used.

(Gel Fraction)

The "gel fraction" refers to an indicator of the degree of crosslinking of the base resins, and is measured according to the crosslinking degree measurement of JASO D625. The lower limit of the gel fraction of the crosslinked product is 60%. When the lower limit of the gel fraction of the crosslinked product is 60%, long-term heat resistance and creep properties may be improved. Meanwhile, the upper limit of the gel fraction of the crosslinked product is 95%. When the upper limit of the gel fraction of the crosslinked product is 95%, cracking or breakage under a use environment due to a decrease in flexibility can be suppressed. The lower limit of the gel fraction of the crosslinked product may be 63%. This is because sufficient heat resistance and creep properties can be obtained. The upper limit of the gel fraction of the crosslinked product may be 90%. This is because cracking or breaking due to reduced flexibility can be suppressed.

The gel fraction is measured according to the crosslinking degree measurement of JASO D625. Insulating layer 4 is cut out from insulated electric wire 1 to obtain a sample, and the sample is immersed in 20 ml of xylene at 120° C. for 24 hours. Next, the sample is pulled out, and it is dried at 100° C. for 6 hours. When the weight of the solid component is represented by W1 [g] and the weight of the heat-shrinkable layer before immersion in xylene is represented by W2 [g], the weight of the heat-shrinkable layer is calculated by the following formula.

$$\text{Gel fraction}[\%\text{ by mass}]=[W1/W2]\times100$$

(Tensile Elongation and Tensile Strength)

The lower limit of the tensile elongation of the crosslinked product measured according to the insulation tensile test of JASO D625 is 150%. When the tensile elongation is 150% or more, the flexibility is improved, and cracking or breaking under a use environment can be suppressed, and thus the water-stop performance (terminal water-stopping performance) can be enhanced. The lower limit of the tensile elongation of the crosslinked product may be 200% or 250%. Further, it is possible to enhance the water-stopping performance (terminal water-topping performance).

The lower limit of the tensile strength of the crosslinked product measured according to the insulation tensile test of JASO D625 is 10 MPa. When the tensile strength is 10 MPa, the mechanical strength can be increased. The lower limit of the tensile strength of the crosslinked product may be 12 MPa. Further, the mechanical strength of insulated electric wire 1 can be increased.

The lower limit of the tensile elongation after maintaining the crosslinked product at 150° C. for 1,500 hours as measured according to the insulation tensile test of JASO D625 is 50%. When the crosslinked product has a tensile elongation of 50% or more after being maintained at 150° C. for 1,500 hours, the long-term heat resistance of insulated electric wire 1 can be increased. The lower limit of the tensile elongation may be 60%. The long-term heat resistance of insulated electric wire 1 can be further enhanced.

[Method for Manufacturing Insulated Electric Wire]

Insulated electric wire 1 can be obtained by a manufacturing method including a step of twisting a plurality of element wires 2 (twisting step), a step of forming insulating layer 4 covering an outer periphery of conductor 3 formed of a plurality of element wires 2 twisted together (insulating layer forming step), and a step of crosslinking a polymer composition constituting insulating layer 4 (crosslinking step). This crosslinking step may be performed before or after covering conductor 3 with the composition for forming insulating layer 4 (after forming insulating layer 4).

A method for coating the outer periphery of conductor 3 with insulating layer 4 is, for example, a method for extruding a polymer composition to the outer periphery of conductor 3.

Examples of a method for crosslinking the polymer composition of insulating layer 4 include an irradiating ionizing radiation method and a thermal crosslinking method.

Examples of the ionizing radiation used in the irradiating ionizing radiation method include γ-rays, electron beams, X-rays, neutron beams, and high-energy ion beams. The lower limit of the dose of ionizing radiations is 10 kGy. If the irradiation dose is less than 10 kGy, the crosslinking reaction may not proceed sufficiently. On the other hand, the upper limit of the dose of ionizing radiations is 400 kGy. If the irradiation dose exceeds the 400 kGy, decomposition of the polymer components may occur. The lower limit of the dose of ionizing irradiation may be 30 kGy. The upper limit of the dose of ionizing irradiation may be 360 kGy.

In the thermal crosslinking method, molecules are decomposed and linked using a thermal crosslinking agent such as an organic peroxide, a metal oxide, or an organic amine compound.

Insulated electric wire 1 of the present disclosure is excellent in long-term heat resistance and water-stopping performance. Therefore, insulated electric wire 1 of the present disclosure is suitable for a high-voltage electric wire for an automobile.

Other Embodiments

It should be understood that the embodiments disclosed herein are illustrative in all respects and are not restrictive. The scope of the present disclosure is not limited to the configurations of the embodiments, but is defined by the claims, and is intended to include all modifications within the meaning and range equivalent to the claims.

Insulating layer 4 of insulated electric wire 1 of the present disclosure may be a multi-layer structure.

Insulated electric wire 1 of the present disclosure may also have a primer layer directly laminated on the conductor. As the primer layer, a layer obtained by crosslinking a crosslinkable resin such as ethylene containing no metal hydroxide can be suitably used. By providing such a primer layer, it is possible to prevent deterioration with time of the peelability of insulating layer 4 and conductor 3.

EXAMPLES

Hereinafter, the insulated electric wire according to an embodiment of the present disclosure will be described in more detail with reference to examples, but the present disclosure is not limited to the following preparation examples.

[Preparation of Insulated Electric Wires No. 1 to No. 11]

A conductor (average outer diameter of 6.5 mm) was prepared by further twisting 19 stranded element wires each of which is obtained by twisting 13 soft copper element wires, each of the element wires having an average outer diameter of 450 μm. A polymer composition mixed at the compounding ratio shown in Table 1 was extrusion-coated on the conductor to form an insulating layer and an insulated electric wire having the above-described electrical wire configuration and having an average outer diameter of 8.7 mm was obtained.

Regarding No. 1 to No. 9, the polymer compositions were crosslinked by irradiating the insulating layers with an electron beam of 240 kGy to obtain crosslinked products. For No. 10 to No. 11, polymer compositions mixed at compounding ratios shown in Table 1 were extruded and coated on the conductors to form insulating layers having the thicknesses described above, and then thermally crosslinked at crosslinking temperatures described in Table 1 to obtain insulated electric wires having the electric wire configuration described above. "-" in Table 1 indicates that the corresponding component was not used.

The components of the polymer composition are as follows.

(Copolymer of Ethylene and α-Olefin Having Carbonyl Group)

In Table 1, the copolymers of ethylene and α-olefin having a carbonyl group used are as follows. Hereinafter, MA represents methyl acrylate.

(1) EMA (MA: 18%) (ethylene-methyl acrylate copolymer)

"Rexpearl EB230X" (registered trademark) manufactured by Nippon Polyethylene Corporation Content in MA unit: 18% by mass (2) EMA (MA: 24%) (ethylene-methyl acrylate copolymer)

"Rexpearl EB050S" (registered trademark) manufactured by Nippon Polyethylene Corporation Content in MA unit: 24% by mass (Polyethylene)

(1) VLDPE (very low-density polyethylene)

"ENGAGE 8842-8422" (trademark) manufactured by The Dow Chemical Company (2) LLDPE (linear low-density polyethylene)

"DFDJ7540" manufactured by NUC Corporation (Ethylene-Based Rubber)

Ethylene-propylene-diene rubber

"Esprene 301" (registered trademark) manufactured by Sumitomo Chemical Company, Ltd.

(Silicone Polymer)

"KE-5634-U" manufactured by Shin-Etsu Chemical Co., Ltd.

(Flame Retardant)

(1) a bromine-based flame retardant ethylenebis (pentabromophenyl); "Saytex8010" (registered trademark) manufactured by Albemarle Corporation (2) Antimony trioxide "PATOX-M" (registered trademark) manufactured by Nihon Seiko Co., Ltd.

(Antioxidant)

(1) a hindered phenol antioxidant;

"Irganox 1010" (registered trademark) manufactured by BASF (2) a sulfur-based antioxidant;

"Irganox PS802" (registered trademark) manufactured by BASF (Crosslinking Aid)

Trimethylolpropane trimethacrylate

"TD1500s" manufactured by DIC Corporation (Thermal Crosslinking Agent)

(1) dicumyl peroxide;

"PERCUMYL D" (registered trademark) manufactured by NOF CORPORATION (2) addition type crosslinking agent containing metal complex-;

"C-25A" manufactured by Shin-Etsu Silicone Co., Ltd.

(3) addition type crosslinking agent containing curing agent;

"C-25B" manufactured by Shin-Etsu Silicone Co., Ltd.

Next, creep modulus, gel fraction, tensile strength, tensile elongation, water-stopping performance and long-term heat resistance of the insulated electric wires of No. 1 to No. 11 were evaluated by the following methods. The evaluation results are shown in Table 1.

(Creep Modulus)

Based on the above-described calculation method, the elastic modulus of the insulating layer of the insulated electric wire was calculated under the condition of maintaining at 150° C. for 1,500 hours.

(Gel Fraction)

The crosslinking degree was measured according to the crosslinking degree measurement of JASO D625. An insulating material was cut out from the insulated electric wire as a sample, and immersed in 20 ml of xylene at 120° C. for 24 hours. The sample was then pulled out, and the sample was dried at 100° C. for 6 hours. Then, when the weight of the solid matter was defined as W1 [g] and the weight of the heat-shrinkable layer before immersion in xylene was defined as W2 [g], a value obtained by the following formula was defined as gel fraction.

$$\text{Gel fraction}[\%\text{ by mass}]=[W1/W2]\times 100$$

(Tensile Strength and Tensile Elongation)

Tensile Strength and Tensile Elongation were measured according to the insulation tensile test of JASO D625. An insulating material was taken from an insulated electric wire, the insulating material was punched into a No. 3 dumbbell shape specified in JIS K6251 (2017), the surfaces were smoothed, and then a test was performed with a tensile tester at a rate of 500 mm/min.

[Water-Stopping Performance]

An annular waterproof silicone rubber plug having an inner diameter smaller than the outer diameter of the electric wire by 20% is formed on the outer periphery of the electric wire having the above-described electric wire configuration and is attached to the electric wire, and a connector housing is formed outside the rubber plug to form a waterproof connector. After this was put into a heat resistance tester at 150° C. for 1,500 hours, the terminals of the housing were sealed, compressed air of 0.2 MPa was fed from the rear ends of the wires in water, and evaluation was performed in two stages, A or B based on the presence or absence of bubbles from the waterproof rubber plugs. The water-stopping performance of the insulating layer was evaluated according to the following criteria. When the evaluation is A, it is good.

A: No bubbles were observed.

B: Bubbles were observed, and water-stopping performance was not sufficient.

(Long-Term Heat Resistance)

With respect to the insulating layer of the insulated electric wire after being maintained at 150° C. for 1,500 hours, the tensile elongation [%] was measured in accordance with the insulation tensile test of JASO D625, and evaluation was performed in two stages A or B based on the tensile elongation. The long-term heat resistance of the insulating layer was evaluated according to the following criteria. When the evaluation is A, it is good.

A: The tensile elongation is 50% or more.

B: Tensile elongation is less than 50%.

TABLE 1

| Test No. of Insulated Electric Wire | | | | No. 1 | No. 2 | No. 3 | No. 4 | No. 5 | No. 6 |
|---|---|---|---|---|---|---|---|---|---|
| Components of Polymer Composition (parts by mass) | Copolymer of Ethylene and α-Olefin having Carbonyl Group | EMA (MA14%) | Rexpearl EB230X | 100 | 100 | — | — | — | — |
| | | EMA (MA24%) | Rexpearl EB050S | — | — | 100 | 50 | 50 | 50 |
| | Polyethylene | VLDPE | ENGAGE8842 | — | — | — | 50 | 50 | 50 |
| | | LLDPE | DFDJ7540 | — | — | — | — | — | — |
| | Ethylene-based Rubber | Ethylene-Propylene Rubber | ESPRENE301 | — | — | — | — | — | — |
| | Silicone Polymer | KE-5634-U | | — | — | — | — | — | — |
| | Flame Retardant | Bromine-based Flame Retardant | Saytex8010 | 35 | 35 | 35 | 35 | 35 | 35 |
| | | Antimony Trioxide | PATOX-M | 10 | 10 | 10 | 10 | 10 | 10 |
| | Antioxidant | Hindered Phenol Antioxidant | Irganox1010 | 4 | 4 | 4 | 4 | 4 | 4 |
| | | Sulfur-based Antioxidant | IrganoxPS802 | 2 | 2 | 2 | 2 | 2 | 2 |
| | Crosslinking Aid | Trimethylolpropane Trimethacrylate | TD1500s | 3 | 3 | 3 | 3 | 3 | 3 |
| | Thermal Crosslinking Agent | Dicumyl Peroxide | PERCUMYL D | — | — | — | — | — | — |
| | | Addition Type Crosslinking Agent containing Metal Complex | C-25A | — | — | — | — | — | — |
| | | Addition Type Crosslinking Agent containing Curing Agent | C-25B | — | — | — | — | — | — |
| Crosslinking Method | | Electron Beam Crosslinking | Irradiation Dose | 240 | 120 | 240 | 180 | 240 | 300 |
| | | Thermal crosslinking | Crosslinking Temperature [° C.] | — | — | — | — | — | — |
| Evaluation | | Creep Modulus [Mpa] | | 0.33 | 0.27 | 0.13 | 0.26 | 0.31 | 0.53 |
| | | Gel Fraction [%] | | 64 | 58 | 45 | 54 | 63 | 66 |
| | | Tensile Strength [Mpa] | | 15.2 | 15.5 | 14.2 | 10.5 | 11.1 | 12.3 |

TABLE 1-continued

| | | | | | | |
|---|---|---|---|---|---|---|
| Tensile Elongation [%] | 550 | 590 | 530 | 510 | 480 | 430 |
| Water-Stopping Performance | A | B | B | B | A | A |
| Heat Resistance | A | A | A | A | A | A |

| Test No. of Insulated Electric Wire | | | | No. 7 | No. 8 | No. 9 | No. 10 | No. 11 |
|---|---|---|---|---|---|---|---|---|
| Components of Polymer Composition (parts by mass) | Copolymer of Ethylene and α-Olefin having Carbonyl Group | EMA (MA14%) | Rexpearl EB230X | — | — | — | — | — |
| | | EMA (MA24%) | Rexpearl EB050S | 50 | 50 | — | — | — |
| | Polyethylene | VLDPE | ENGAGE8842 | 50 | 50 | — | — | — |
| | | LLDPE | DFDJ7540 | — | — | 100 | — | — |
| | Ethylene-based Rubber | Ethylene-Propylene Rubber | ESPRENE301 | — | — | — | — | 100 |
| | Silicone Polymer | KE-5634-U | | — | — | — | 100 | — |
| | Flame Retardant | Bromine-based Flame Retardant | Saytex8010 | 35 | 35 | 35 | — | 35 |
| | | Antimony Trioxide | PATOX-M | 10 | 10 | 10 | — | 10 |
| | Antioxidant | Hindered Phenol Antioxidant | Irganox1010 | 4 | 4 | 4 | — | 4 |
| | | Sulfur-based Antioxidant | IrganoxPS802 | 2 | 2 | 2 | — | 2 |
| | Crosslinking Aid | Trimethylolpropane Trimethacrylate | TD1500s | 3 | 3 | 3 | — | 3 |
| | Thermal Crosslinking Agent | Dicumyl Peroxide | PERCUMYL D | — | — | — | — | 3 |
| | | Addition Type Crosslinking Agent containing Metal Complex | C-25A | — | — | — | 2 | — |
| | | Addition Type Crosslinking Agent containing Curing Agent | C-25B | — | — | — | 1 | — |
| Crosslinking Method | | Electron Beam Crosslinking | Irradiation Dose | 360 | 420 | 240 | — | — |
| | | Thermal crosslinking | Crosslinking Temperature [° C.] | — | — | — | 160 | 160 |
| Evaluation | Creep Modulus [Mpa] | | | 0.64 | 0.68 | 0.34 | 2.30 | 1.20 |
| | Gel Fraction [%] | | | 70 | 74 | 66 | 80 | 85 |
| | Tensile Strength [Mpa] | | | 13.5 | 13.9 | 14.9 | 5.4 | 12.1 |
| | Tensile Elongation [%] | | | 320 | 130 | 480 | 540 | 490 |
| | Water-Stopping Performance | | | A | B | A | A | A |
| | Heat Resistance | | | A | B | A | A | A |

As shown in Table 1, the insulated electric wires of No. 1, No. 5 to No. 7, No. 9, and No. 11 in each of which the insulating layer was formed of a crosslinked product of a polymer composition containing an ethylene-based copolymer, polyethylene, or a combination thereof as a main component and had the calculated creep modulus was 0.3 MPa or more, the gel fraction was 60% or more, and the tensile elongation was 150% or more calculated under the condition of maintaining at 150° C. for 1,500 hours were excellent in long-term heat resistance and water-stopping performance. On the other hand, the insulated electric wires No. 2 to No. 4 in each of which the calculated creep modulus was less than 0.3 MPa and the gel fraction was less than 60% under the condition of maintaining at 150° C. for 1,500 hours were poor in water-stopping performance. The insulated electric wire of No. 8 having a tensile elongation of less than 150% was poor in both long-term heat resistance and water-stopping performance. In No. 10 in which the insulating layer was composed of a crosslinked product of a polymer composition containing a silicone polymer as a main component, the long-term heat resistance and water-stopping performance were good, but the tensile strength was very poor.

From the above, it can be seen that the insulated electric wire of the present disclosure is excellent in long-term heat resistance and water-stopping performance.

REFERENCE SIGNS LIST

1 insulated electric wire
2 element wire
3 conductor
4 insulating layer

The invention claimed is:

1. An insulated electric wire comprising:

a conductor formed of a plurality of element wires twisted together;

and an insulating layer covering an outer periphery of the conductor, wherein, the insulating layer is formed of a thermally crosslinked product of a polymer composition and a flame retardant, the polymer composition contains, as a main component, an ethylene-based copolymer, polyethylene, or a combination of the ethylene-based copolymer and the polyethylene, the insulating layer has a gel fraction of 60% or more, the insulating layer has a tensile elongation of 150% or more, the insulating layer has a tensile elongation of 50% or more after being maintained at 150° C. for 1,500 hours, the insulating layer has a creep modulus of 0.3 MPa or more, as calculated under a condition of maintaining the insulating layer at 150° C. for 1,500 hours, and the flame retardant includes at least a bromine-based flame retardant, wherein the insulating layer is formed as a single, homogeneous layer.

2. The insulated electric wire according to claim 1, wherein the insulating layer has a tensile strength of 10 MPa or more.

3. The insulated electric wire according to claim 2, wherein the number of the element wires is 7 to 2,450.

4. The insulated electric wire according to claim 2, wherein the element wires have an average outer diameter of 100 μm to 600 μm.

5. The insulated electric wire according to claim 1, wherein the number of the element wires is 7 to 2,450.

6. The insulated electric wire according to claim 5, wherein the element wires have an average outer diameter of 100 μm to 600 μm.

7. The insulated electric wire according to claim 1, wherein the element wires have an average outer diameter of 100 μm to 600 μm.

8. The insulated electric wire according to claim 7, wherein the insulated electric wire achieves an "A" rating in a terminal water-stop evaluation performed under an automotive standard requiring aging at 150° C. for 1,500 hours prior to the evaluation.

9. The insulated electric wire according to claim 1, wherein the conductor has an average cross-sectional area of 0.5 $mm^2$ to 100 $mm^2$.

10. The insulated electric wire according to claim 1, wherein the insulated electric wire is used as a high-voltage electric wire for an automobile.

11. The insulated electric wire according to claim 1, wherein the number of the element wires is 7 to 2,450.

12. The insulated electric wire according to claim 1, wherein the flame retardant is uniformly dispersed in the polymer composition prior to the thermal crosslinking, and the thermal crosslinking reaction is applied to the full composition.

13. The insulated electric wire according to claim 1, wherein the insulating layer is non-foamed and contains no intentional foaming agent.

14. The insulated electric wire according to claim 13, wherein the insulating layer has a density of 0.90 to 0.97 $g/cm^3$ at 23° C.

15. The insulated electric wire according to claim 1, wherein the polymer composition is free of polyamide and free of ultrafine nylon fibers, and the insulating layer is free of a silane coupling agent.

16. The insulated electric wire according to claim 1, wherein the total content of metal hydroxide fillers selected from magnesium hydroxide and aluminum hydroxide is less than 5 parts by mass per 100 parts by mass of the polymer composition.

17. The insulated electric wire according to claim 1, wherein the bromine-based flame retardant comprises decabromodiphenyl ethane, ethylenebis (pentabromophenyl), or a mixture thereof.

18. The insulated electric wire according to claim 17, further comprising antimony trioxide as a synergist, wherein a mass ratio of the bromine-based flame retardant to the antimony trioxide is between 2:1 and 10:1.

19. The insulated electric wire according to claim 1, wherein the insulating layer has a creep modulus of 0.5 MPa or more after being maintained at 150° C. for 1,500 hours.

20. The insulated electric wire according to claim 1, wherein the insulating layer consists essentially of the polymer composition, the bromine-based flame retardant, and antioxidants, and excludes foaming agents, polyamide fibers, and metal hydroxide loadings greater than 5 parts by mass per 100 parts by mass of the polymer composition.

* * * * *